(12) United States Patent
Arbuckle et al.

(10) Patent No.: US 12,298,769 B1
(45) Date of Patent: May 13, 2025

(54) NAVIGATION CONTROL SYSTEM AND METHOD FOR A MARINE VESSEL

(71) Applicant: Brunswick Corporation, Mettawa, IL (US)

(72) Inventors: Jason S. Arbuckle, Horicon, WI (US); Kyle K. Karnick, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 237 days.

(21) Appl. No.: 18/150,298

(22) Filed: Jan. 5, 2023

(51) Int. Cl.
  *G05D 1/02* (2020.01)
  *B63H 20/12* (2006.01)
  *B63H 21/21* (2006.01)
  *G01S 19/42* (2010.01)
  *G05D 1/00* (2006.01)

(52) U.S. Cl.
  CPC ........... *G05D 1/0206* (2013.01); *B63H 20/12* (2013.01); *B63H 21/213* (2013.01); *G01S 19/42* (2013.01)

(58) Field of Classification Search
  CPC .... G05D 1/0206; B63H 20/12; B63H 21/213; G01S 19/42
  See application file for complete search history.

(56) References Cited

U.S. PATENT DOCUMENTS

| | | |
|---|---|---|
| 9,132,903 B1 | 9/2015 | Gable et al. |
| 9,952,595 B2 | 4/2018 | Arbuckle et al. |
| 10,198,005 B2 | 2/2019 | Arbuckle et al. |
| 10,795,366 B1 | 10/2020 | Arbuckle et al. |
| 10,829,191 B2 | 11/2020 | Wong et al. |
| 10,926,855 B2 | 2/2021 | Derginer et al. |
| 11,247,753 B2 | 2/2022 | Arbuckle et al. |
| 11,403,955 B2 | 8/2022 | Derginer et al. |
| 2020/0247518 A1 | 8/2020 | Dannenberg et al. |

*Primary Examiner* — Rodney A Butler
(74) *Attorney, Agent, or Firm* — Andrus Intellectual Property Law, LLP (57) ABSTRACT

A method for controlling propulsion of a marine vessel includes receiving a lock control instruction designating two locked axes and one unlocked axis out of a surge access, a sway access, and a yaw access. Upon receiving the lock instruction, a current GPS position and a current heading of the marine vessel are sensed and a movement track is defined for the unlocked axis based on the current GPS position and the current heading. The movement track is defined such that the vessel position with respect to each of the two locked axes is unchanged. A thrust command input is received and then at least one propulsion device is controlled to move the marine vessel on the movement track based on the thrust command input while automatically maintaining the vessel position with respect to each of the two locked axes.

21 Claims, 8 Drawing Sheets

NAVIGATION CONTROL SYSTEM AND METHOD FOR A MARINE VESSEL

FIELD

The present disclosure generally relates to navigation control systems for marine vessels and methods for implementing navigation control systems for marine vessels, and more specifically, to control systems and methods configured to enable a user to designate a subset of directional axes to manually control while the remaining axes are automatically controlled by the navigation system.

BACKGROUND

The following U.S. Patents and Applications provide background information and are incorporated herein by reference, in entirety.

U.S. Pat. No. 9,132,903 discloses Systems and methods for maneuvering a marine vessel having a plurality of steerable propulsion devices. The plurality of propulsion devices are controlled to achieve a lateral movement by controlling the steering orientation of port and starboard propulsion devices so that forward thrusts provided by the port and starboard propulsion devices intersect at or forwardly of a center of turn of the marine vessel. One of the port and starboard propulsion devices is operated to provide a forward thrust and the other of the port and starboard propulsion devices is operated to provide a reverse thrust so that the lateral movement is achieved and a resultant yaw component is applied on the marine vessel. An intermediate propulsion device is controlled to apply an opposing yaw component on the marine vessel that counteracts the resultant yaw component.

U.S. Pat. No. 9,952,595 discloses a method for maneuvering a marine vessel powered by a propulsion system includes accepting inputs to an electronic navigation device and generating a desired track based on the inputs. The desired track includes a series of waypoints, each waypoint in the series of waypoints being associated with a respective heading. The method also includes sending position and orientation information corresponding to each waypoint and its associated heading to a control module. Based on the position and orientation information, the control module generates steering and thrust commands that are required to maneuver the marine vessel from a current waypoint and heading in the series to a following waypoint and heading in the series. According to the steering and thrust commands, the propulsion system thereafter propels the marine vessel along the desired track to each waypoint and its associated heading in succession. A corresponding system is also disclosed.

U.S. Pat. No. 10,198,005 discloses a method for controlling movement of a marine vessel including controlling a propulsion device to automatically maneuver the vessel along a track including a series of waypoints and determining whether the next waypoint is a stopover waypoint at or near which the vessel is to electronically anchor. If the next waypoint is the stopover waypoint, a control module calculates a distance between the vessel and the stopover waypoint. In response to the calculated distance being less than or equal to a threshold distance, the propulsion device's thrust is decreased. In response to sensing that the vessel thereafter slows to a first threshold speed, the vessel's speed is further reduced. In response to sensing that the vessel thereafter slows to a second, lower threshold speed or passes the stopover waypoint, the propulsion device is controlled to maintain the vessel at an anchor point which is at or near the stopover waypoint.

U.S. Pat. No. 10,926,855 discloses a method for controlling low-speed propulsion of a marine vessel powered by a marine propulsion system having a plurality of propulsion devices that includes receiving a desired inertial velocity of the marine vessel and determining a steering position command and a powerhead command for each of the plurality of propulsion devices based on the desired inertial velocity and controlling the propulsion system accordingly. An actual velocity of the marine vessel is measured and a difference between the desired inertial velocity and the actual velocity is determined, where the difference is used as feedback in subsequent steering position command and powerhead command determinations.

U.S. Pat. No. 11,247,753 discloses a method for maintaining a marine vessel at a global position and/or heading includes receiving measurements related to vessel attitude and estimating water roughness conditions based on the measurements. A difference between the vessel's actual global position and the target global position and/or a difference between the vessel's actual heading and the target heading are determined. The method includes calculating a desired linear velocity based on the position difference and/or a desired rotational velocity based on the heading difference. The vessel's actual linear velocity and/or actual rotational velocity are filtered based on the roughness conditions. The method includes determining a difference between the desired linear velocity and the filtered actual linear velocity and/or a difference between the desired rotational velocity and the filtered actual rotational velocity. The method also includes calculating vessel movements that will minimize the linear velocity difference and/or rotational velocity difference and carrying out the calculated movements.

U.S. Pat. No. 11,403,955 discloses a propulsion control system on a marine vessel that includes at least one propulsion device configured to propel the marine vessel and at least one proximity sensor system configured to generate proximity measurements describing a proximity of an object with respect to the marine vessel. The system further includes a controller configured to receive proximity measurements, access a preset buffer distance, and calculate a velocity limit in a direction of the object for the marine vessel based on the proximity measurements and the preset buffer distance so as to progressively decrease the velocity limit as the marine vessel approaches the preset buffer distance from the object.

U.S. Patent Publication No. 2020/0247518 discloses a marine propulsion system including at least one propulsion device and a user input device configured to facilitate input for engaging automatic propulsion control functionality with respect to a docking surface, wherein the user input device includes a direction indicator display configured to visually indicate a direction with respect to the marine vessel. A controller is configured to identify a potential docking surface, determine a direction of the potential docking surface with respect to the marine vessel, and control the direction indicator display to indicate the direction of the potential docking surface with respect to the marine vessel. When a user selection is received via the user input device to select the potential docking surface as a selected docking surface, and propulsion of the marine vessel is automatically controlled by controlling the at least one propulsion device to move the marine vessel with respect to the selected docking surface.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one implementation, a method for controlling propulsion of a marine vessel includes receiving a lock control instruction designating two locked axes and one unlocked axis out of a surge access, a sway access, and a yaw access. Upon receiving the lock instruction, a current GPS position and a current heading of the marine vessel are sensed and a movement track is defined for the unlocked axis based on the current GPS position and the current heading. The movement track is defined such that the vessel position with respect to each of the two locked axes is unchanged. A thrust command input is received to control propulsion along the unlocked axis. At least one propulsion device is controlled to move the marine vessel on the movement track based on the thrust command input while automatically maintaining the vessel position with respect to each of the two locked axes.

In one example, at least one target GPS position and at least one target heading are determined based on the current GPS position, the current heading, and the lock control instruction. The movement track is then defined based on the target GPS position and/or the target heading.

In another example, unlocked axis is one of the surge axis and the sway axis, and the movement track includes a list of allowable GPS coordinates defining a line with respect to the marine vessel between the current GPS position and a target GPS position and wherein the target heading is equal to the current heading.

In another example, the unlocked axis is the surge axis and the movement track includes a list of allowable GPS positions spanning a predetermined distance in the direction of the current heading.

In another example, the unlocked axis is the yaw axis and the movement track includes a list of allowable headings between the current heading and a target heading, wherein the target GPS position is equal to the current GPS position.

In another example, once the thrust command input is received, propulsion output of the at least one propulsion device is controlled based on a magnitude of the thrust command input to move the marine vessel along the movement track.

In a further example, the thrust command input to move the marine vessel along the movement track based on a magnitude of joystick displacement on a joystick movement axis associated with the unlocked axis. In one such embodiment, all joystick displacements other than on the joystick movement axis associated with the unlocked axis are ignored.

In another example, the lock control instruction is generated in response to a user input selecting one of the surge axis, the sway axis, and the yaw axis as the unlocked axis.

In another example, the lock control instruction is generated automatically by an autonomous propulsion controller, and wherein the autonomous propulsion controller generates the thrust command input based on proximity data from at least one proximity sensor.

In another example, an autonomous propulsion controller determines that a threshold uncommanded vessel movement is occurring on at least one of the surge axis, the sway axis, and the yaw axis, wherein the autonomous propulsion controller automatically generates the lock control instruction designating the at least one axis where the uncommanded vessel movement is occurring as at least one of the two locked axes.

In one implementation, a propulsion control system on a marine vessel includes at least one propulsion device configured to propel the marine vessel and a control system configured to, based on a lock control instruction designating two locked axes and one unlocked axis out of a surge axis, a sway axis, and a yaw axis, define a movement track for the unlocked axis based on a current GPS position and a current heading. The movement track is defined such that the marine vessel position with respect to each of the two locked axes is unchanged. At least one propulsion device is then controlled to move the marine vessel on the movement track based on a thrust command input while automatically maintaining vessel position with respect to each of the two locked axes.

In one example, the unlocked axis is the surge axis, and wherein the movement track includes a list of GPS coordinates spanning a predetermined distance in a direction of the current heading.

In another example, wherein the control system is further configured to determine at least one target GPS position and at least one target heading based on the current GPS position, the current heading, and the lock control instruction, and then define the movement track based on the target GPS position and the target heading.

In another example, the unlocked axis is one of the surge axis and the sway axis, and wherein the movement track includes a list of allowable GPS coordinates defining a fore and/or aft line or a lateral line with respect to the marine vessel between the current GPS position and the target GPS position and wherein the target heading is equal to the current heading.

In another example, the unlocked axis is the yaw axis and the movement track includes a list of allowable headings between the current heading and a target heading and wherein the target GPS position is equal to the current GPS position.

In another example, the control system is further configured to control propulsion output of the at least on propulsion device based on a magnitude of the thrust command input to move the marine vessel to move the marine vessel along the movement track, wherein the magnitude of the thrust command input is based on a magnitude of joystick displacement on a joystick movement axis associated with the unlocked axis.

In another example, the control system is configured to ignore all joystick displacements other than on the joystick movement axis associated with the unlocked axis.

In another example, the lock control instruction is based on a user input selecting one of the surge axis, the sway axis, and the yaw axis as the unlocked axis.

In another example, the lock control instruction is generated by an autonomous propulsion controller.

In another example, the control system is further configured to determine that a threshold uncommanded vessel movement is occurring on at least one of the surge axis, the sway axis, and the yaw axis, and then automatically identify the lock control instruction and designate the at least one axis where the uncommanded vessel movement is occurring as at least one of the two locked axes.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Prior art systems are inadequate for assisting a user to maneuver a boat in tight quarters, such as to dock the vessel or navigate through a tight passage between or around obstacles. Manual vessel control systems, for example, require a user to control vessel propulsion in three control axes—surge, sway, and yaw—while compensating for environmental factors like current, wind, and waves. Autonomous control modes, like autonomous collision avoidance systems, station keeping systems, or waypoint control systems, provide autonomous control in all three control axes and thus do not allow the user to control any portion of navigation. User control may be superior and/or desirable for navigating in tight quarters, where judgment and/or communication may be required to properly maneuver the vessel.

Moreover, the inventors have recognized that velocity control systems providing autonomous control of vessel movement may be inadequate for precise vessel position control over a duration because many velocity sensors lack sufficient resolution for very precise vessel control over a duration. For example, position keeping control systems have the ability to control position and heading (standard station keeping), position only (bowhook), or heading only (drifthook). These various position keeping features are helpful in certain boating situations where full autonomous control is desired, such as where the driver may leave the helm or otherwise divert their attention away from navigating the vessel. However, these modes do not allow the user to control any aspects of the vessel navigation and thus are not equipped for use in situations where it would be helpful for the user to control one or more axis of movement. Likewise, these modes do not permit autonomous movement control along one or a subset of axis based on ranging data from perception sensing systems, including cameras or other ranging sensors, while locking control of designated axes—for example, controlling surge based on perceptive systems and relegate maintenance control of the other two axes to PID controllers or other closed loop or back end control systems to provide propulsion control commands for maintaining the vessel position unchanged with respect to the locked axes.

The inventors have recognized unique problems presented by autonomous and semi-autonomous vessel control systems for operating in marine environments where marine vessels have additional degrees of freedom of movement compared to automotive applications—for example, environmental factors can effectuate vessel movement, particularly lateral and/or yaw movement not commanded by a user input or a navigation controller. Compensation for environmental factors puts additional demands on an autonomous navigation system, which may have insufficient processing power to control movement on all three movement axes simultaneously based on sensed proximity information. Furthermore, many velocity-based autonomous systems are inadequate because the velocity sensors utilized do not sufficient resolution to measure vessel movement of 0.1 m/s or less, but such control precision is necessary for controlling a vessel in tight questers such as for docking or launch. Namely, detection of slow vessel drift at or below 0.1 m/s—e.g., such as due to current, wind, or waves—is important for avoiding collisions when maneuvering in docks or marinas, for example.

Based on recognition of the forgoing problems and challenges in the relevant art, the inventors developed the disclosed navigation control system and method that enables a user to lock a subset of axes among the surge axis, sway axis, and yaw axis and control the remaining axis or axes. The user may enter a lock control instruction specifying which axis (or axes) are locked and which are user-controllable. Upon receiving the lock instruction, a current GPS position and a current heading of the marine vessel are sensed and at least one target GPS position and/or at least one target heading are determined based on the lock control instruction to define a movement track for the unlocked axis or axes. The movement track defines a series of vessel positions along each unlocked axis wherein each locked axis remains unchanged for each of the series of vessel positions in the movement track. In one embodiment, two axes are lock and one axis is unlocked for user control, and thus a movement track for the unlocked axis is defined by the control system where the vessel position with respect to each of two locked axes is unchanged.

The joystick or other user input device (throttle levers, steering wheel, keypad, touch screen, etc.) can then be utilized to exercise control of each unlocked axis. Alternatively, the navigation controller may control the "unlocked" axis based on proximity sensor data from cameras or other range sensors. A thrust command input is received to control propulsion along the unlocked axis, which may be from a user input device or a navigation controller. Vessel propulsion is then controlled, including sending commands to at least one propulsion device, to move the marine vessel along the movement track based on the thrust command input while automatically maintaining vessel position with respect to each of the locked axes.

The following is an exemplary scenario of a user implementing the disclosed method and system for purposes of illustration. Where a user is controlling the vessel to move it into position on a lift device, such as a trailer or boat lift, the user controls vessel propulsion (controlling surge, sway, and yaw) to get the vessel into an initial position where the bow is pointing directly toward the lift device and the long axis of the boat is aligned with the lift device. The user provides a lock control instruction designating the surge (fore/aft) direction for continued user control and locking the vessel position with respect to the sway (sideways left/right) and yaw axes so that the vessel can only move along a straight line extending from the bow at the current heading. The control system then automatically maintains the vessel position on the locked axes and calculates a movement track in the surge direction that maintains the locked surge position and heading. The control system will hold the vessel along this line against disturbances like wind and current so that the vessel remains aligned with the trailer automatically. Movement of the vessel in the surge direction only progresses along the movement track based on user inputs, such as via the throttle or the joystick. Thus, the user controls only the fore/aft movement of the vessel and does not have to control steering via the wheel or joystick to account for disturbances. Where a joystick is used, only the joystick displacement along the movement axis associated with the unlocked axis (here, the surge axis) is acted upon by the control system. So, if the user accidentally pushes the joystick off axis, no corresponding propulsion command is generated other than along the movement track defined by the control system. This allows the user to control the amount of throttle used to load the vessel on the lift device, which can vary due to boat ramp angle, depth of the trailer or lift apparatus, the hull shape, vessel weight and type, etc.

Figure 1:
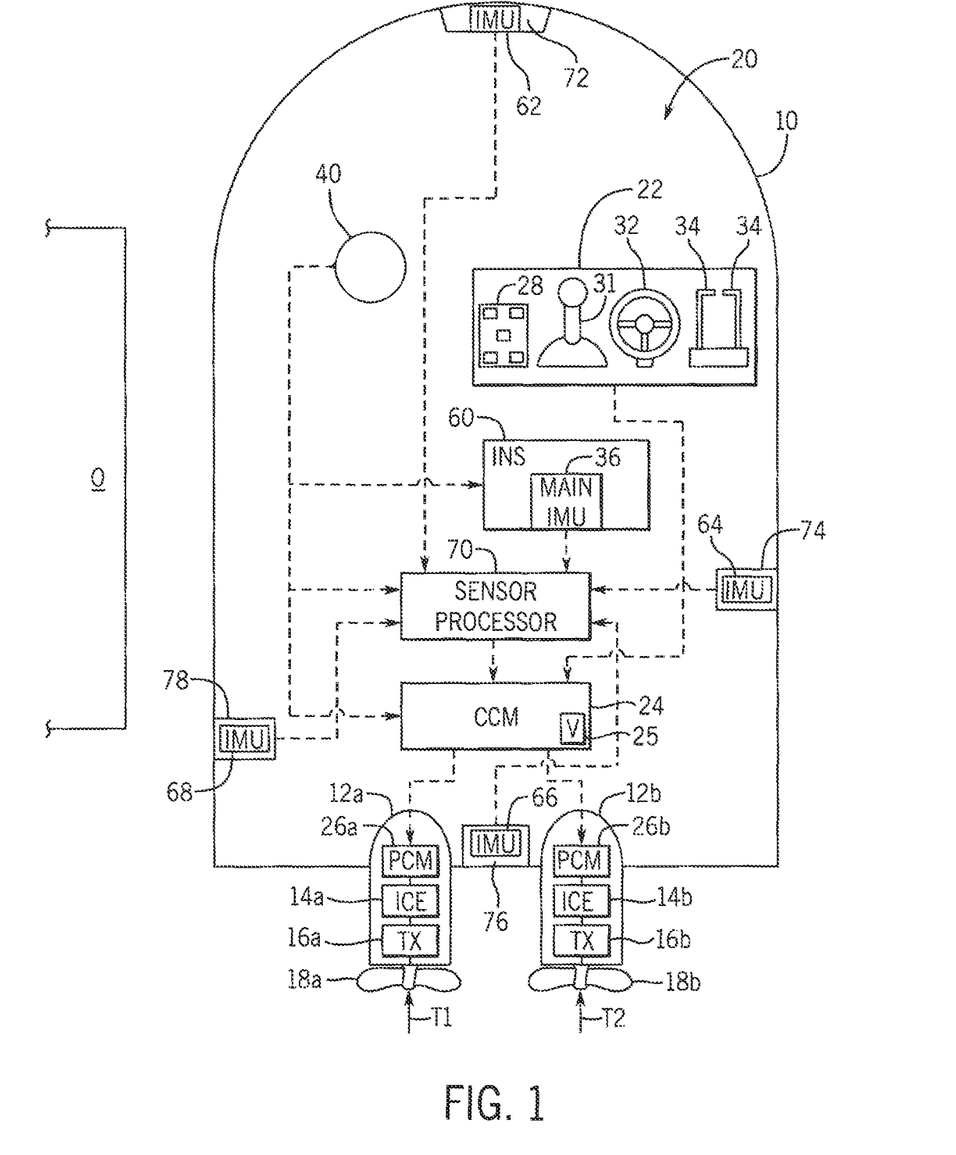
FIG. 1 is a schematic illustration of a marine vessel with one embodiment of a propulsion system according to the present disclosure.

FIG. 1 shows a marine vessel 10 equipped with a propulsion control system 20 on a marine vessel 10 configured according to one embodiment of the disclosure. The propulsion control system 20 is capable of operating, for example, in a joysticking mode where a joystick is operated by a user to control vessel movement within an x/y plane, among other modes, as described hereinbelow. The propulsion system 20 has first and second propulsion devices 12a, 12b that produce first and second thrusts T1, T2 to propel the vessel 10. The first and second propulsion devices 12a, 12b are illustrated as outboard motors, but they could alternatively be inboard drives, stern drives, jet drives, pod drives, or the like. Each propulsion device is provided with a powerhead 14a, 14b, such as an engine or electric motor, operatively connected to a transmission 16a, 16b, in turn, operatively connected to a propeller 18a, 18b. In some embodiments, particularly where the powerhead 14a, 14b is an electric motor, transmission may not be included and the motor may be configured to directly drive propeller rotation in a 1 to 1 ratio.

The vessel 10 also houses various control elements that comprise part of the propulsion control system 20. The system 20 comprises an operation console 22 in signal communication, for example via a CAN bus arrangement (such as described in U.S. Pat. No. 6,273,771) with a central controller 24, such as for example a command control module (CCM), and with propulsion control modules (PCM) 26a, 26b associated with the respective propulsion devices 12a, 12b. This control arrangement is merely exemplary and other arrangements of control modules are well known and can be configured to perform the methods and functions herein. Each of the controller 24 and the PCMs 26a, 26b (as well as other control modules communicatively connected in the control system 20) may include a memory and a programmable processor. As is conventional, each controller 24, 26a, 26b includes a processor communicatively connected to a storage system comprising a memory upon which computer readable code and data is stored. The processor can access the computer readable code and, upon executing the code, carry out functions, such as the navigation control functions and/or the proximity sensing functions, as described in detail herein.

The operation console 22 includes a number of user input devices, such as a keypad 28, a joystick 31, a steering wheel 32, and one or more throttle/shift levers 34. Each of these devices inputs commands to the controller 24. The controller 24, in turn, communicates control instructions to the first and second propulsion devices 12a, 12b by communicating with the PCMs 26a, 26b. The steering wheel 32 and the throttle/shift levers 34 function in a conventional manner such that rotation of the steering wheel 32, for example, activates a transducer that provides a signal to the controller 24 regarding a desired direction of the vessel 10. The controller 24, in turn, sends signals to the PCMs 26a, 26b (and/or thrust vector modules (TVMs) or additional modules if provided), which in turn activate steering actuators to achieve desired orientations of the propulsion devices 12a, 12b. The propulsion devices 12a, 12b are independently steerable about their steering axes. The throttle/shift levers 34 send signals to the controller 24 regarding the desired gear (forward, reverse, or neutral) of the transmissions 16a, 16b (and/or commanding corresponding motor function for an electric powerhead 14a, 14b) and the desired rotational speed of the powerheads 14a, 14b of the propulsion devices 12a, 12b. The controller 24, in turn, sends signals to the PCMs 26a, 26b, which in turn activate electromechanical actuators in the transmissions 16a, 16b and powerheads 14a, 14b for shift and throttle, respectively. A manually operable input device, such as the joystick 31, can also be used to provide control input signals to the controller 24. As is standard with joystick control systems, the joystick 31 can be used to allow the operator of the vessel 10 to manually maneuver the vessel 10, such as to achieve fore/aft (surge) translation, lateral (sway) translation, and rotation (yaw translation) of the vessel 10.

GPS information is also received from at least one GPS receiver 40 on the vessel comprising part of a global positioning system (GPS). The GPS receiver 40 is located at a pre-selected fixed position on the vessel 10, which provides information related to global position of the marine vessel 10. In various embodiments, the control system 20 may be configured to calculate the GPS position with respect to a location on the vessel 10 other than the fixed position of the GPS receiver based on the known position of that location with respect to the fixed position of the GPS receiver. For example, the GPS position of the center of turn (COT) 30 may be determined based on the fixed position of the GPS receiver relative to the COT 30.

Autonomous and/or advanced operator assistance (i.e., semi-autonomous) controls for autonomous vessel handling requires placement of multiple proximity sensors on the vessel 10 and may be engaged to control the unlocked axis. For example, the control system may include an autonomous propulsion controller 25 programmed to control propulsion devices 12a and 12b of the marine vessel 10, and thus to vessel navigation in one or more directions, such along the unlocked axis, based on proximity data generated by sensors on the marine vessel. The autonomous propulsion controller 25 may be a subcontroller, or control algorithm, implemented by the central controller 24, or may be a separate control module with its own memory and processor. In general, these various types of proximity sensing devices are positioned to detect the presence of objects in the marine environment surrounding the marine vessel 10, such as a dock, another vessel, a swimmer, or other obstruction in the path of the vessel. Each sensor reports proximity relative to its own frame of reference—i.e. the distance from the sensor to the object as measured along the view angle of the sensor. Depending on the type of sensor, the application of use, boat size, hull shape, etc., multiple sensor types and sensor locations may be required to provide adequate proximity sensing around the marine vessel 10 for operation in all marine environments. One exemplary sensor arrangement shown in FIG. 1, and further details and examples are described at U.S. Pat. Nos. 10,926,855 and 11,403,955 and U.S. Pat. Pub. 2020/0247518.

With reference to the embodiment shown in FIG. 1, the propulsion control system 20 may include one or more proximity sensors 72, 74, 76, and 78. Although one proximity sensor is shown on each of the bow, stern, port and starboard sides of the vessel 10, fewer or more sensors may be provided at each location and/or provided at other locations, such as on a hardtop of the vessel 10. The proximity sensors 72-78 are distance and directional sensors. For example, the sensors could be radars, sonars, cameras, lasers (e.g. lidars or Leddars), Doppler direction finders, or other devices individually capable of determining both the distance and direction (at least approximately)—i.e., the relative position of an object O with respect to the vessel 10, such as a dock, a seawall, a slip, another vessel, a large rock or tree, etc. The sensors 72-78 provide information regarding both a direction of the object with respect to the marine vessel 10 and a shortest distance between the object O and the vessel 10. Alternatively, separate sensors could be provided for sensing direction than are provided for sensing distance, or more than one type of distance/direction sensor can be provided at a single location on the vessel 10. The sensors 72-78 provide this distance and/or direction information to one or more controllers, such as to the sensor processor 70 and/or the CCM 24, such as by way of a dedicated bus connecting the sensors to a controller, a CAN bus, or wireless network transmissions, as described in more detail below.

Regarding the proximity sensors, 72, 74, 76, 78, note that different types of sensors may be used depending on the distance between the vessel 10 and the object O. For example, radar sensors may be used to detect objects at further distances. Once the vessel 10 comes within a particular distance of the object, lidar, ultrasonic, Leddar, or sonar sensors may instead be used. Camera sensors may be used, alone or in combination with any of the sensors mentioned above, in order to provide object proximity information to the CCM 24. Sensors are placed at positions on the vessel 10 so that they are at the correct height and facing direction to detect objects the vessel 10 is likely to encounter. Optimal sensor positions will vary depending on vessel size and configuration.

In FIG. 1, the proximity sensors are positioned at each of the front, sides, and stern of the vessel 10, and include front-facing sensor 72, starboard-facing sensor 74, rear-facing sensor 76, and port-facing sensor 78. In a different exemplary sensor arrangement, two proximity sensors may be placed on the hard top of the marine vessel 10 and arranged such that the fields of view of the two sensors, combined, cover the entire 360° area surrounding the vessel 10. Note also that the relevant controller, such as the sensor processor 70, may selectively operate any one or more of a plurality of sensors (including radars, lidars, Leddars, ultrasonics, and cameras) to sense the shortest distance and the direction of the object with respect to the vessel 10. Alternatively, the sensor processor 70 may use all available sensor data from all sensor types, which may be reviewed real time as it is received or may be formulated into one or more maps or occupancy grids integrating all proximity measurement data, where the mapped data from all the operated sensors is processed as described herein. In such an embodiment, the proximity measurements from each of the various sensors are all translated into a common reference frame.

To create a cohesive dataset that can be used for purposes of vessel control and vessel navigation, including autonomous vessel navigation and semi-autonomous control (such as automatic maneuver-limiting control), all of the data sources may be translated to a common reference frame, such as at the sensor processor 70. This requires precise information regarding the location and orientation of each sensor relative to the common reference frame such that the data measured therefrom can be translated appropriately. This information can be acquired via a calibration process, which may be manually performed at the time of installation or may be automatically performed by the sensors, such as described at U.S. Pat. No. 11,436,927 which is hereby incorporated by reference in its entirety.

Referencing the example in FIG. 1, the main IMU 36 may be part of an inertial navigation system (INS) such as including one or more micro-electro-mechanical systems (MEMS). For example, the INS 60 may consist of a MEMS angular rate sensor, such as a rate gyro, a MEMS accelerometer, and a magnetometer. Such INS systems are well known in the relevant art. In other embodiments, the motion and angular position (including pitch, roll, and yaw) may be sensed by a differently configured INS 60, or by an attitude heading reference system (AHRS) that provides 3D orientation of the marine vessel 10 by integrating gyroscopic measurements, accelerometer data, and magnetometer data, or by a motion reference unit (MRU), tilt sensor, or any combination of these devices.

In the example of FIG. 1, a main inertial measurement unit (IMU) 36 or other vessel orientation and movement sensor is installed at a known location on the marine vessel with respect to a predefined point of navigation, such as the center of rotation (COR) or center of gravity (COG). The installation orientation or the main IMU 36 is also known. In FIG. 1 an IMU 62-68 is co-located with each proximity sensor 72-78. These sensor IMUs 62-68 may be configured similarly to the main IMU, such as each comprising a rate gyro, an accelerometer, and a magnetometer and producing corresponding IMU data. The IMU data from each sensor IMU 62-68 may be used for various purposes, such as for automatic calibration and verification of the proximity sensor system, for angular measurements used to interpret the proximity measurements by the relevant proximity sensor 72-78, and/or as backup IMUs in case of fault or failure of the main IMU 36. The installation locations of the main IMU 36 and each proximity sensor 72-78 may be established as part of a calibration procedure for the proximity sensing system, such as that described in U.S. Pat. No. 11,436,927.

The present inventors have recognized that autonomous and semi-autonomous control systems for marine vessels need to be "aware" of relevant vessel acceleration limits to avoid high speed collision with obstacles but allowing approach and gentle impact. Exemplary propulsion control algorithms are shown and described at U.S. Pat. Nos. 10,926,855 and 11,403,955. The controller 24, such as by the autonomous propulsion controller 25, may be configured to set a velocity or acceleration limit in one or more directions, such as in the direction of the unlocked axis, based on proximity data. For example, the autonomous propulsion controller 25 may be configured to control propulsion such that the velocity or acceleration limit is not exceeded. By knowing the velocity or acceleration limit, and by having an awareness of the distance range to obstacles, the control system can determine a maximum vessel velocity that can be realized in the unlocked axis, where the vessel is held static with respect to the locked axes. The acceleration limit is the maximum acceleration a vessel can reach for both speeding up and slowing down, where maximum deceleration of a marine vessel is accomplished by effectuating a maximum acceleration in the opposite direction.

Figure 2A:
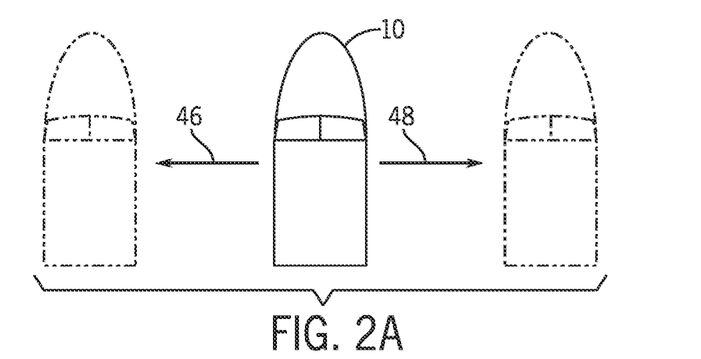
FIGS. 2A-2E are schematic illustrations of various movements of a marine vessel.
Figure 2B:
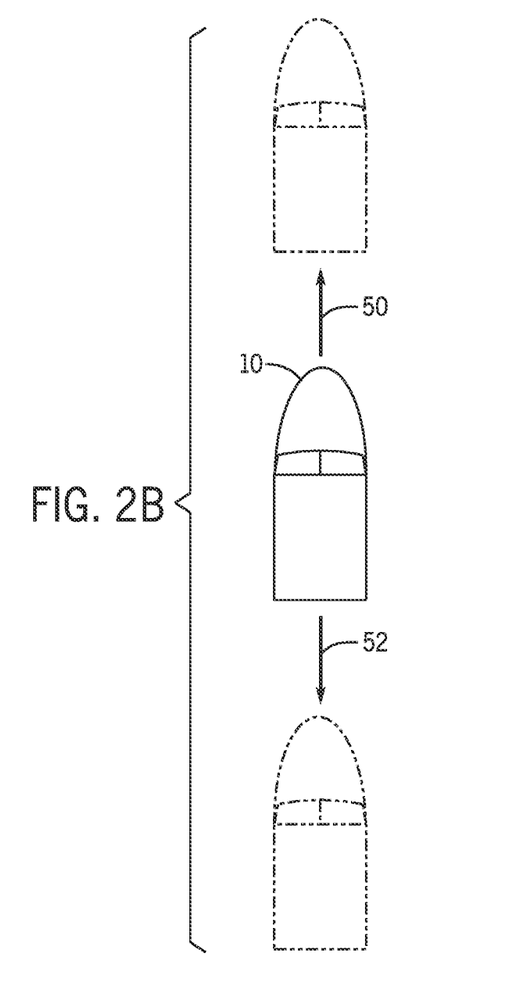
Figure 2C:
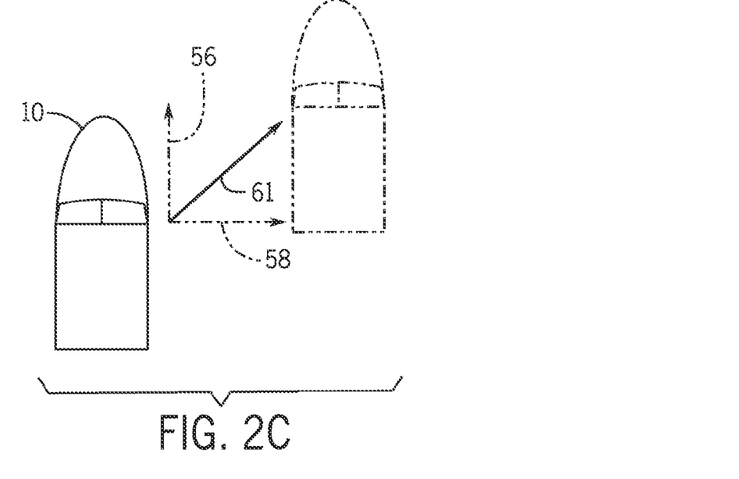
Figure 2D:
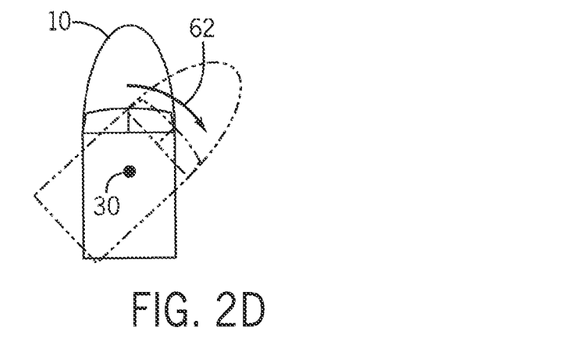
Figure 2E:
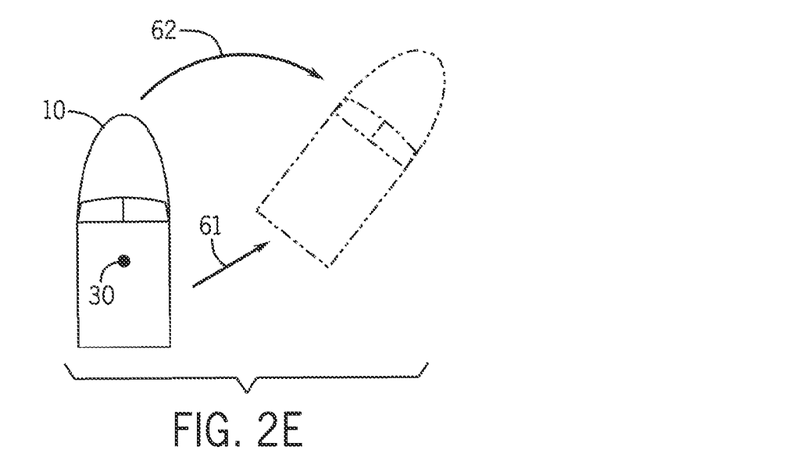

FIGS. 2A-2E illustrate exemplary vessel movements that may be commanded via a user input device at the operation console 22 and/or by the autonomous propulsion controller 25. FIG. 2A shows the vessel 10 moving laterally, or sway movement, in the port direction 46 and the starboard direction 48 without any forward or reverse motion and without any rotation about its COT 30. FIG. 2B shows the vessel 10 moving in the forward 50 direction and backward 52 direction, also known as surge movement. FIG. 2C shows a combination of forward surge and starboard sway motions of the vessel 10, where the surge movement is represented by the dashed arrow 56 and the sway movement is represented by the dashed arrow 58. The resultant motion vector 61 moves the vessel in the forward and starboard directions without any rotation. FIG. 2D illustrates a clockwise rotation, or yaw movement, represented by arrow 62 of the marine vessel 10 about the COT 30 without any translation movement, including any surge movement or sway movement. FIG. 2E illustrates a combination of yaw movement, represented by arrow 62, and surge and sway translation in the forward and starboard directions, represented by arrow 61.

Figure 3:
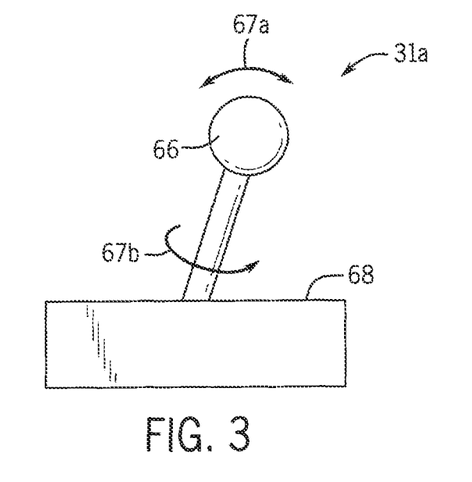
FIG. 3 illustrates an exemplary joystick user input device.
Figure 4:
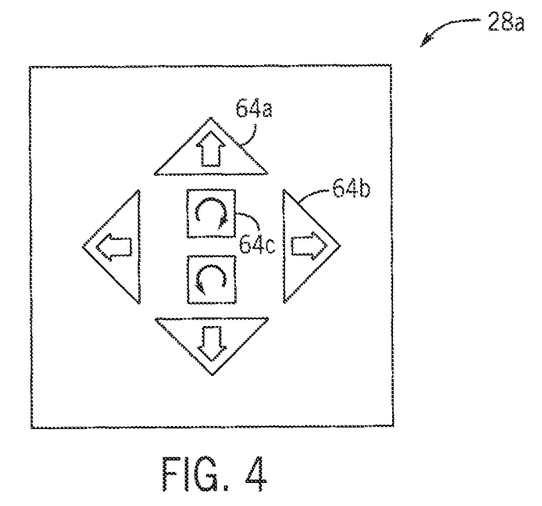
FIG. 4 illustrates an exemplary keypad user input device.

FIGS. 3 and 4 exemplify two possible types of user input devices. FIG. 3 depicts a well-known joystick device 31a that comprises a base 68 and a moveable handle 66 suitable for movement by an operator. Typically, the handle can be moved left and right (represented by arrow 67a), forward and back, as well as twisted (represented by arrow 67b) relative to the base 68 to provide corresponding movement commands for the propulsion system. FIG. 4 depicts an alternative user input device being a keypad 28a with buttons 64 associated with each of the right, left, forward, backward, and rotational movement directions. Thus, a forward button 64a can be pressed by a user to provide a forward thrust command to move the marine vessel forward and key 64b can be pressed by a user to input a lateral thrust command to command lateral movement of the marine vessel 10. Similarly, the clockwise rotation key 64c can be pressed by a user to input a clockwise rotational thrust command to command clockwise rotational movement of the marine vessel 10. The other keys on the keypad 28a operate similarly. The joystick 31a and keypad 28a are merely exemplary, and other types of user input devices enabling a user to command lateral and rotational movement are within the scope of the present disclosure.

In certain embodiments, the joystick 31 or other user input device (e.g., the keypad 28) may be operable in multiple modes selectable by a user. For example, the joystick 31 or other user input device may be operable in a first mode to control all vessel motion in the surge, sway, and yaw directions. The joystick 31 or other user input device may also be operable in a second mode to control only the unlocked axis such that the control system 20 is not responsive to inputs at the user input device commanding any propulsion direction other than along the unlocked axis.

Figure 5:
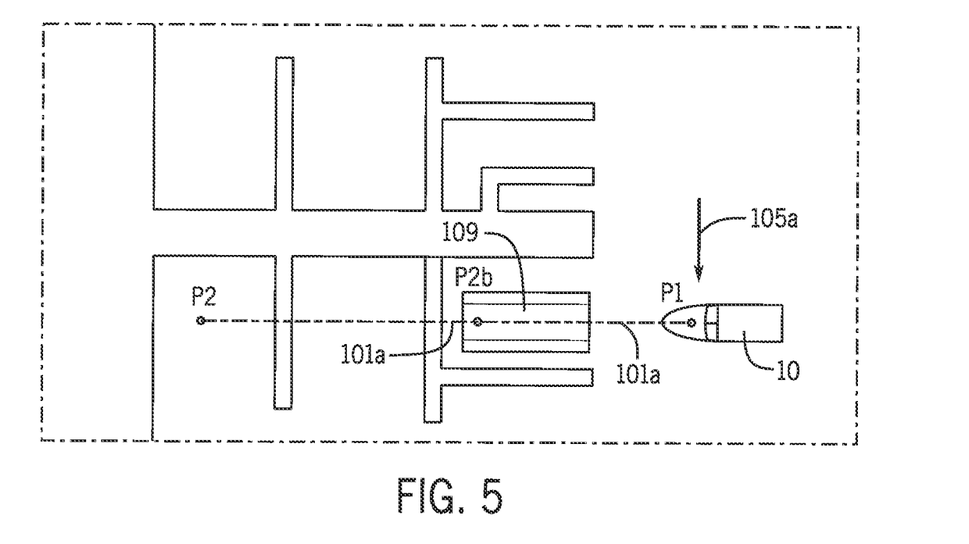
FIGS. 5-7 illustrate exemplary implementations of methods or systems for controlling propulsion of the marine vessel in accordance with embodiments of the present disclosure.
Figure 6:
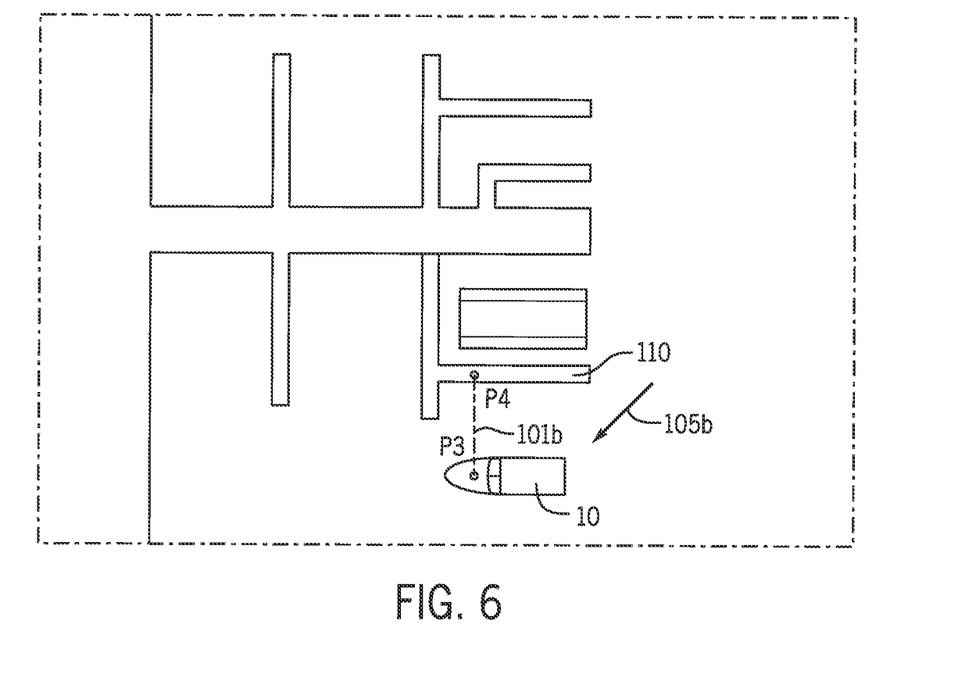
Figure 7:
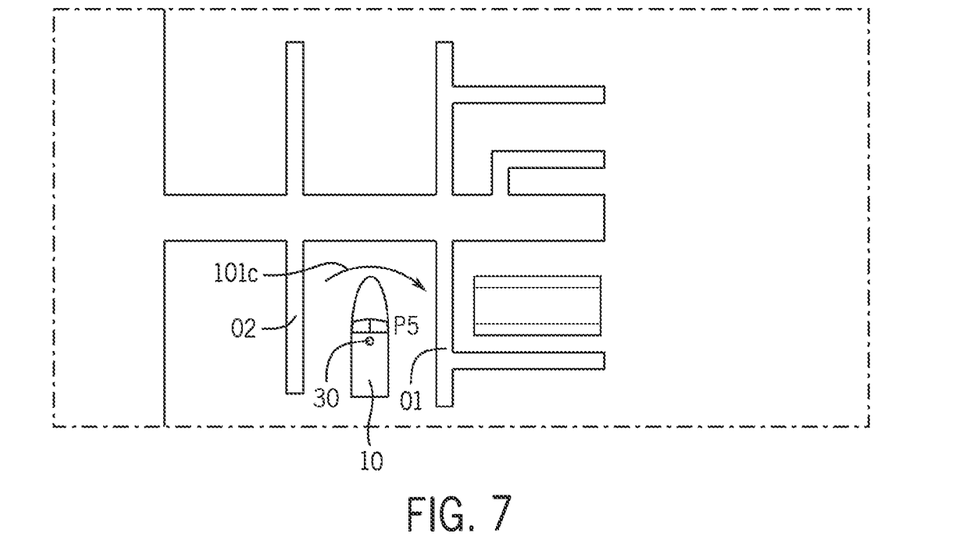

FIGS. 5-7 show exemplary docking and maneuvering scenarios implementing the disclosed methods and systems to provide navigation control in constrained spaces within a docking area. The examples illustrate three different scenarios designating three different sets of locked axes and defining movement tracks on the unlocked axes such that the vessel position with respect to each of the two locked axes is unchanged. Accuracy and ease of controlling the vessel into the docking location, or other precise vessel maneuvering, is improved utilizing the disclosed control system and method.

In FIG. 5, the vessel 10 is being maneuvered into a docking location within a boat lift 109. A cross wind in the direction of arrow 105a is hitting the vessel's starboard side and pushing it in the port direction, causing undesired and uncommanded sway motion of the vessel. Uncommanded yaw motion may also result due to uneven wind forces or water resistance on the stern compared to the bow. This makes it difficult for the operator or the autonomous propulsion controller 25 to navigate the vessel into the docking location because compensation for wind and waves is constantly needed. Once the vessel is substantially aligned with the target boat lift, the lock control instruction is provided to lock the surge and sway axes. Since the vessel needs to be navigated in the surge direction (straight ahead) to move into the boat lift, the surge axis remains unlocked and in control of the user or in control of the autonomous propulsion controller 25. A movement track 101a is defined for movement of the vessel on surge axis based on the GPS position and the vessel heading, where the movement track keeps the vessel position unchanged in the sway and yaw axes. A target heading is also set, which here is equal to the current heading since the yaw axis is locked. Thus, the current heading will be maintained automatically by the control system based on feedback from the INS 60 and/or one or more of the IMUs 36, 62-86. Where engaged by an autonomous propulsion controller 25, the controller can then utilize proximity data to control propulsion only in the surge direction while vessel position along the locked axes is automatically maintained by a PID or some other sub controller. This reduces the processing load and frees up capacity, enabling faster processing of proximity data and other relevant inputs to control the vessel in the unlocked direction.

The movement track 101a is defined as a set of positions allowing the vessel 10 to move from its current position forward toward the boat lift 109. In some embodiments, the movement track 101a may be defined to allow vessel movement in both the forward and reverse surge directions, while the sway and yaw position remain substantially unchanged. In one embodiment, the movement track 101a is a list of allowable GPS positions defining movement of the vessel in a straight line in the forward and/or revers surge directions. For example, the movement track 101a may defined as a list GPS positions between the current GPS position of the vessel, here the latitude and longitude position P1, and a target GPS position. The target GPS position may be, for example, a predetermined distance from the vessel along the unlocked axis. Thus, as here the surge axis is unlocked, the target GPS position may be defined as a GPS location at a predefined location in a straight line in front of the vessel, along the vessel heading direction. Similarly, the target GPS position may be set as a GPS position in a straight line behind the marine vessel.

In another embodiment, the target GPS position may be established based on proximity measurements of an object and/or other perceptive data, such as identifying a target object or area for docking. For example, the system may be configured to identify a dock, slip, boat lift, or other object based on a pattern of proximity measurements recognizable as such. Exemplary methods for dock recognition based on proximity measurements are illustrated and disclosed at U.S. Pat. Pub. 2020/0247518. Alternatively, the system may be configured to allow the user to select an object for docking, such as based on a visual representation of an occupancy grid of an area around the marine vessel in the direction of the unlocked axis. In still other embodiments, the target GPS position may be any type of object, not just one appropriate for docking.

Alternatively, the control system 20 may be configured to set the target GPS position based on the nearest proximity measurement in the path of the vessel traveling on the unlocked axis. In such an embodiment, the target GPS position may be defined as the GPS location at the distance of the object location, or a predefined distance closer or further from the marine vessel from the object location. For example, the control system may set the target GPS location beyond the proximity measurement of the object to allow the user to approach and gently impact the object with the vessel, such as for docking the vessel against the object. Alternatively, the system may be configured to prevent the vessel from hitting the object, such as to prevent the bow of the vessel from impacting the far end of the boat lift or the front of a boat trailer. In certain embodiments, the control system 20 may be configured to utilize proximity measurements differently for setting the target GPS position based on which direction is unlocked and or for different situations, such as whether the user is trailering or docking the boat. For example, the system 20 may be configured to accept a user input to select a trailering mode or a docking mode. Alternatively, the target GPS position may be defined by the user via other methods, such as the user setting a distance.

In FIG. 5, two different embodiments of a target GPS position is illustrated. A first target GPS position, latitude and longitude position P2, is set further beyond the target docking location to allow maneuverability of the vessel in the unlocked direction to whatever position is ideal for docking. For example, the first target GPS position P2 may be defined as a predetermined distance in front of the marine vessel. Where the target GPS position P2 is utilized, the movement track 101a extends through and well beyond the boat lift 109 defining the target docking location. In another embodiment, the target GPS position may be defined based on proximity measurements to a location, e.g., the front end, on boat lift. This is illustrated in FIG. 1 as target GPS position P2b, which is defined as a distance to a measured location within the boat lift, such as at the far end of the boat lift such that the vessel is limited in terms of how far it can travel in the unlocked direction.

In FIG. 6, the vessel 10 is being maneuvered laterally, i.e., in the sway direction, into a docking location against the dock 110. In this example, the wind is approaching the vessel diagonally, in the direction of arrow 105b, and moving the vessel in the surge and sway directions as well as imparting a yaw force on the vessel. Once the vessel is substantially aligned with its docking position, here where the vessel is oriented substantially parallel to the dock, the lock instruction is generated to lock the surge and yaw axes, leaving the sway direction unlocked so that the vessel can be controlled by the user or the autonomous propulsion controller 25 to approach the dock. A movement track 101b may be, for example, a list of allowable GPS positions defined for movement of the vessel in a straight line on the sway axis based on the vessel GPS position and heading at the time of engagement of the mode or otherwise upon instruction. The vessel heading and surge position thus remain substantially unchanged while the vessel is moved in the sway direction along the movement track, which is presumably defined to enable movement in the direction of the dock 110, but may also be defined to allow movement in the opposite sway direction away from the dock.

In FIG. 6, the movement track 101b is defined between the vessel's current GPS location, latitude and longitude position P3, and the target GPS position, latitude and longitude position P4. As described above, the target GPS position may be set as a GPS position a predetermined distance from the vessel in the unlocked direction, or it may be established based on proximity measurements or by other methods. Here, the target GPS position is set as a location on the dock 110 which may be determined by any of the methods described above. The measurement track 101b is defined accordingly, as a list of allowable GPS positions that the vessel can occupy between its current GPS position P3, and the target GPS position P4. The vessel is then permitted to move to any location on the movement track, such as based on user input, while the vessel position is automatically maintained with respect to the yaw and surge axes.

FIG. 7 depicts an example where the vessel is being maneuvered to spin in place about its COT 30 (or COG) without any surge or sway movement. Thus, the vessel 10 can turn while GPS position is maintained (e.g., via a PID controller) so as to maneuver the vessel without hitting objects O1 AND O2 on either side. The lock control instruction designates the surge and sway axes as the locked axes, and the yaw axes is the unlocked axis available for manual control by a user or control by the autonomous propulsion controller 25. Upon receipt of the lock control instruction, the target GPS position is set equal to the current GPS position such that the vessel position on the surge and sway axes is maintained. The current GPS position may be set with respect to the vessel's COT 30 so that it is at the stationary portion of the vessel when the vessel turns in place. The movement track 101c is set as a list of allowable headings between the current heading and a target heading. In one embodiment, the target heading may be set to 180 degrees from the current heading and the movement track 101c may be defined as the list of headings in each rotational direction between the current measured heading and the target heading. Thereby, the movement track defines and permits 360 degrees of rotation based on the thrust command input commanding rotational movement of the vessel, such as a joystick twist. In another embodiment, the target heading may be set to a different angle from the current heading and/or may be defined in only one rotational direction. For example, the target heading and the rotational direction for the movement track may be selectable by the user. Once the movement track 101c is defined, the vessel is rotatable based on user inputs or other thrust command inputs to rotate the vessel on the movement track while the vessel position on the surge and sway axes remains unchanged.

Figure 8:
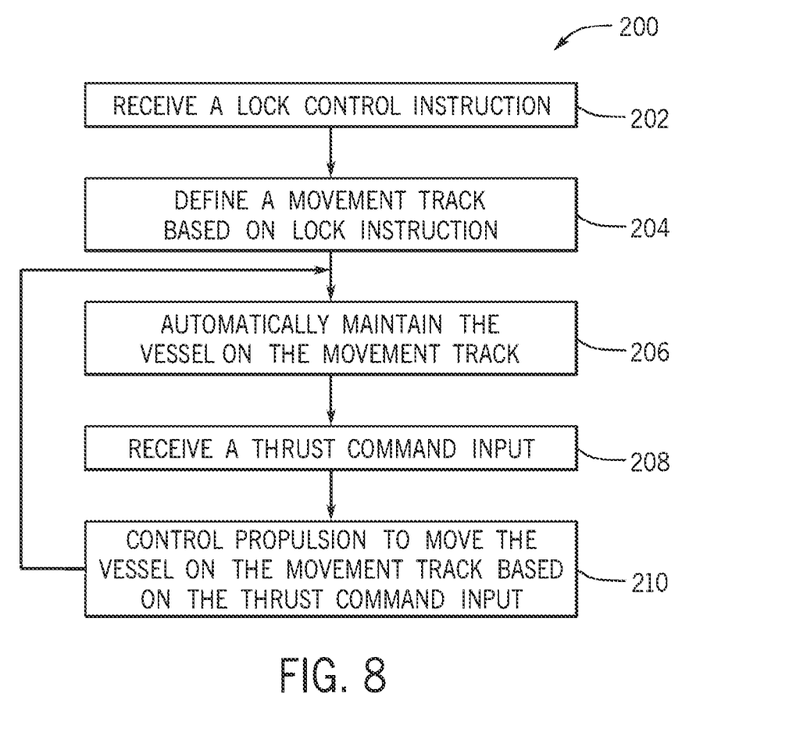
FIGS. 8-10 are flow charts illustrating methods for controlling propulsion of the marine vessel, or portions of control methods, in accordance with embodiments of the present disclosure.
Figure 9:
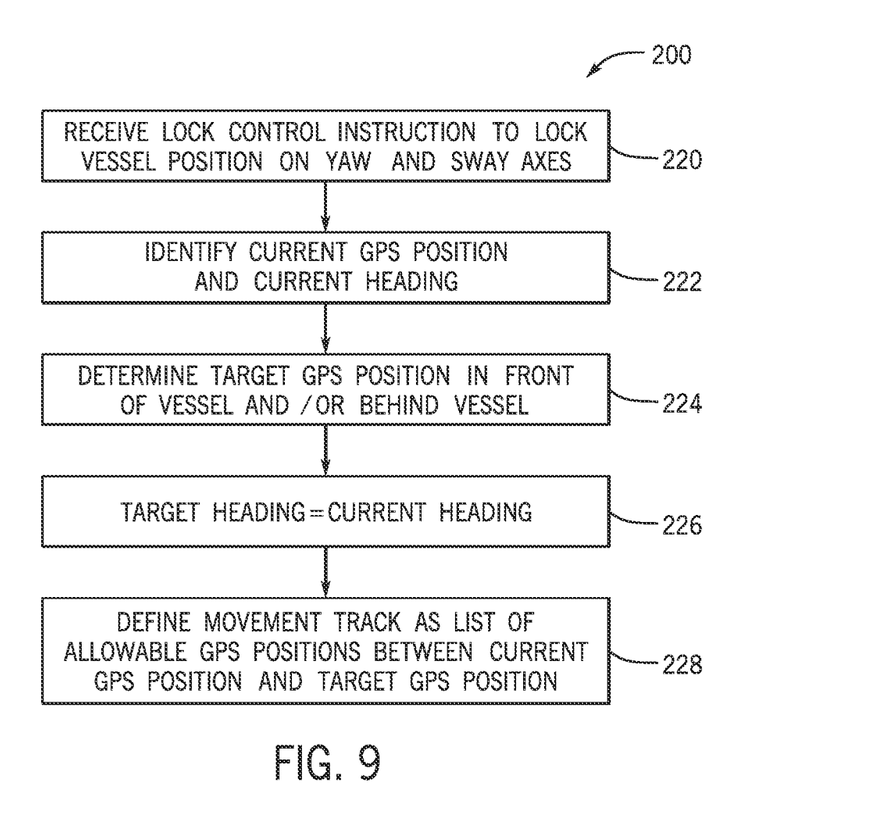
Figure 10:
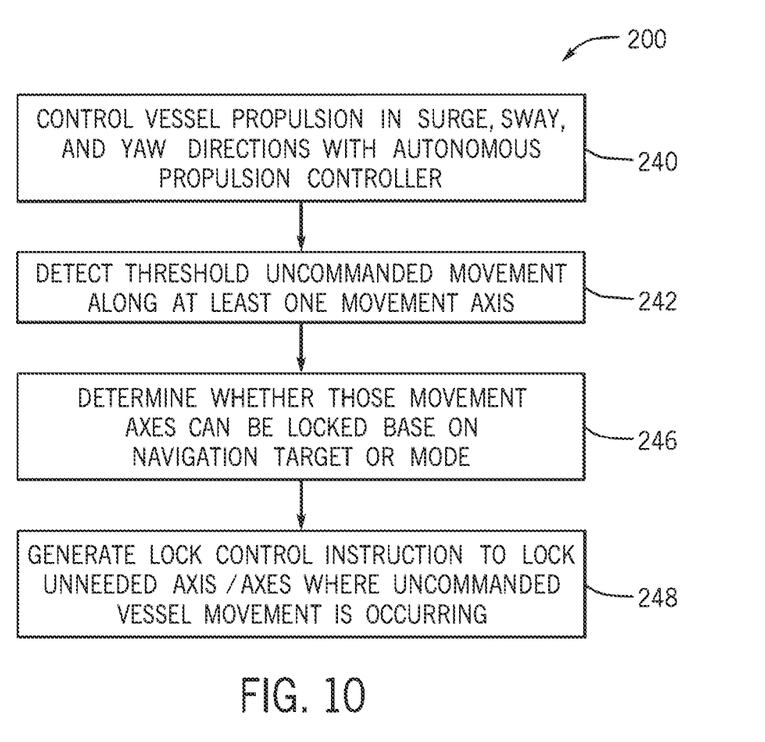

FIGS. 8-10 depict methods 200 for controlling propulsion of the marine vessel 10, or portions of methods for identifying locked and unlocked axes and defining movement track space thereon. In FIG. 8, a lock control instruction is received at step 202. For example, the lock control instruction may be based on user input, such as via a device at the operation console 22. To provide just one example, the joystick 31 may be configured to enable the user to provide input such as via a button on the housing of the joystick, to engage the lock control mode and/or provide instruction as to which axes to lock and which axes should remain unlocked. Alternatively or additionally, the operation console 22 may include a touch screen configured for user selection of a lock control mode and designation of locked and/or unlocked axes. Alternatively, as described above, the lock control instruction may be generated automatically by the autonomous propulsion controller 25. An exemplary embodiment of method steps executed by the autonomous propulsion controller 25 for determining when and on what axes to engage the lock control is described below with respect to FIG. 10.

Upon receipt of the lock control instruction, which includes specification of which axes are locked and which are unlocked, a movement track is defined at step 204 for movement of the marine vessel 10 along the unlocked axis while maintaining the vessel position unchanged with respect to each of the two locked axes. Examples are described herein for defining the movement track based on the lock instruction, the current GPS position, and the current heading of the marine vessel.

In some embodiments, the control system 20 is configured to automatically maintain the marine vessel on the movement track while the lock control mode is engaged. Thus, upon receiving the lock control instruction, the control system 20 may automatically control propulsion to maintain the current heading and current GPS position of the marine vessel 10 until a thrust command input is received, at which point only movement along the movement track is permitted and performed. At step 206, the control system 20 automatically maintains the vessel on the movement track. The propulsion devices 12a and 12b are controlled to compensate for any vessel movement in the surge, sway, or yaw direction, depending on the definition of the movement track. In certain embodiments, the control system may be further configured to maintain the current vessel position on all three axes, including the unlocked axis, unless and until a thrust command input is received. In other embodiments, the control system may be configured to allow movement of the marine vessel along the unlocked axis and thus only automatically maintain the vessel position with respect to the locked axis.

A thrust input command is received at step 208. For example, the thrust command input may be received via a device at the operation console, such as the joystick 31, throttle levers 34, or keypad 28. In certain embodiments, all user command inputs other than for thrust command along the movement axis associated with the unlocked axis are ignored. For example, all joystick displacements other than on the joystick movement axis associated with the unlocked axis may be ignored. Thus, inadvertent movements of the joystick in the wrong direction will not produce corresponding thrust outputs. Alternatively, the thrust command input may be provided by another user input device, such as the throttle levers. In one embodiment, the control system 20 may be configured to interpret movement of the throttle levers as a thrust command input to move the vessel on the movement track. In still other embodiments, the thrust command input may be received from the autonomous propulsion controller, such as based on proximity sensing and other perception systems.

The propulsion devices 12a and 12b on the vessel are then controlled accordingly to move the vessel on the movement track at step 210 based on the thrust command input received at step 208. For example, the output of the propulsion device may be based on a magnitude of the thrust command input, such as based on a magnitude of the joystick displacement and the joystick movement axis associated with the unlocked axis.

FIG. 9 depicts an embodiment of a propulsion control method 200 for effectuating lock control designating the surge axis as the unlocked axis, such as illustrated in FIG. 5. A lock control instruction is received at step 220 designating the yaw and sway axes as the locked axes and the surge axis as the unlocked axis. The current GPS position and current heading of the marine vessel are sensed at step 222. A target GPS position is defined at step 224 as a location in front of the vessel and/or behind the vessel. For example, the target GPS position may be defined as a predetermined distance in front of and behind the sensed current GPS position. Alternatively, as described above, the target GPS position may be determined based on proximity data and/or based on user input. The target heading is set equal to the current heading at step 226 since the yaw position of the marine vessel is locked. The movement track is then defined at step 228 as a list of allowable GPS positions between the current GPS position and the target GPS position.

FIG. 10 illustrates one embodiment of a propulsion control method 200 wherein the lock control instruction is generated automatically by an autonomous propulsion controller 25. Vessel propulsion is initially controlled at step 240 in all of the surge, sway, and yaw directions. The autonomous propulsion controller 25 detects a threshold uncommanded movement along at least one movement axis at step 242. For example, uncommanded surge, sway, or yaw movement may be movements measured by the INS 60 and/or one or more of the IMUs that do not correspond in magnitude or direction with a propulsion command or other movement command originating from the autonomous propulsion controller 25 or elsewhere in the control system 20. If the movement of the vessel does not correspond with the measured vessel movement, and the difference is at least a threshold difference, then the autonomous propulsion controller 25 may execute steps to engage the lock control functionality described herein. The threshold for uncommanded movement may be a distance threshold. To provide just one illustrative example, the distance threshold may be an uncommanded vessel movement of 0.1 meters, or may be greater such as 0.5 meters or even 1 meter. Alternatively, the threshold uncommanded movement may be a velocity, such as 0.1 meters/second. In various embodiments, the threshold may be set differently for the different movement axes, or the thresholds may be equal for all three movement axes. Alternatively or additionally, the thresholds for uncommanded movement may be adjusted based on vessel control mode or user interface modality.

Step 246 is then executed to determine whether the movement axes or the uncommanded vessel movement detected can be locked. For example, the determination may be based on the navigation target and/or the navigation mode. For example, if a forward movement mode is engaged, such where propulsion instructions are being inputted from the user at the throttle levers and steering wheel, then it may be determined that the vessel needs user navigation input in the surge direction and thus the surge axis should not be locked. Similarly, if docking mode is engaged and the docking target is in the surge direction (which, as described above, may be instructed based on user input or based on pattern recognition of proximity data) meaning that the vessel needs to be navigated in the surge direction, then the surge axis should not be locked. Conversely, if the docking mode is engaged and the navigation target is in the surge direction, the yaw and/or surge axes may be locked if uncommanded movement is detected along those axes.

The lock control instruction is generated by the autonomous propulsion controller at step 248 to lock the unneeded axis or axes or uncommanded vessel movement is occurring. The control system 20 then proceeds as described above to define the movement track and control vessel propulsion accordingly.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method for controlling propulsion of a marine vessel, the method comprising:
   receiving a lock control instruction designating two locked axes and one unlocked axis out of a surge axis, a sway axis, and a yaw axis;
   upon receiving the lock control instruction, sensing a current GPS position and a current heading of the marine vessel and defining a movement track for the unlocked axis based on the current GPS position and the current heading, wherein the movement track is defined such that the marine vessel position with respect to each of the two locked axes is unchanged;
   receiving a thrust command input to control propulsion along the unlocked axis; and
   controlling at least one propulsion device to move the marine vessel on the movement track based on the thrust command input while automatically maintaining vessel position with respect to each of the two locked axes.

2. The method of claim 1, wherein the unlocked axis is the surge axis, and wherein the movement track includes a list of allowable GPS positions spanning a predetermined distance in a direction of the current heading.

3. The method of claim 1, further comprising determining at least one target GPS position and at least one target heading based on the current GPS position, the current heading, and the lock control instruction; and
   defining the movement track based on the target GPS position and the target heading.

4. The method of claim 3, wherein the unlocked axis is one of the surge axis and the sway axis, and wherein the movement track includes a list of allowable GPS coordinates defining a fore and/or aft line or a lateral line with respect to the marine vessel between the current GPS position and the target GPS position and wherein the target heading is equal to the current heading.

5. The method of claim 3, wherein the unlocked axis is the yaw axis and the movement track includes a list of allowable headings between the current heading and the target heading and wherein the target GPS position is equal to the current GPS position.

6. The method of claim 1, further comprising, upon receiving the lock control instruction, automatically controlling the at least one propulsion device to maintain a measured vessel heading equal to the current heading and maintain the marine vessel at a current GPS position on the movement track until the thrust command input is received.

7. The method of claim 1, once the thrust command input is received, controlling propulsion output of the at least on propulsion device based on a magnitude of the thrust command input to move the marine vessel along the movement track.

8. The method of claim 7, wherein the magnitude of the thrust command input is based on a magnitude of joystick displacement on a joystick movement axis associated with the unlocked axis, and wherein all joystick displacements other than on the joystick movement axis associated with the unlocked axis are ignored.

9. The method of claim 1, wherein the lock control instruction is generated in response to a user input selecting one of the surge axis, the sway axis, and the yaw axis as the unlocked axis.

10. The method of claim 1, wherein the lock control instruction is generated automatically by an autonomous propulsion controller and wherein the autonomous propulsion controller generates the thrust command input based on proximity data from at least one proximity sensor.

11. The method of claim 10, further comprising, with the autonomous propulsion controller:
    determining that a threshold uncommanded vessel movement is occurring on at least one of the surge axis, the sway axis, and the yaw axis; and
    automatically generating the lock control instruction designating the at least one axis where the uncommanded vessel movement is occurring as at least one of the two locked axes.

12. A propulsion control system on a marine vessel, the propulsion control system comprising:
    at least one propulsion device configured to propel the marine vessel;
    a control system configured to:
       based on a lock control instruction designating two locked axes and one unlocked axis out of a surge axis, a sway axis, and a yaw axis, define a movement track for the unlocked axis based on a current GPS position and a current heading, wherein the movement track is defined such that the marine vessel position with respect to each of the two locked axes is unchanged; and
       control at least one propulsion device to move the marine vessel on the movement track based on a thrust command input while automatically maintaining vessel position with respect to each of the two locked axes.

13. The system of claim 12, wherein the unlocked axis is the surge axis, and wherein the movement track includes a list of GPS coordinates spanning a predetermined distance in a direction of the current heading.

14. The system of claim 12, wherein the control system is further configured to:
    determine at least one target GPS position and at least one target heading based on the current GPS position, the current heading, and the lock control instruction; and
    define the movement track based on the target GPS position and the target heading.

15. The system of claim 14, wherein the unlocked axis is one of the surge axis and the sway axis, and wherein the movement track includes a list of allowable GPS coordinates defining a fore and/or aft line or a lateral line with respect to the marine vessel between the current GPS position and the target GPS position and wherein the target heading is equal to the current heading.

16. The system of claim 14, wherein the unlocked axis is the yaw axis and the movement track includes a list of allowable headings between the current heading and a target heading and wherein the target GPS position is equal to the current GPS position.

17. The system of claim 12, wherein the control system is further configured to control propulsion output of the at least on propulsion device based on a magnitude of the thrust command input to move the marine vessel to move the marine vessel along the movement track;

wherein the magnitude of the thrust command input is based on a magnitude of joystick displacement on a joystick movement axis associated with the unlocked axis.

18. The system of claim 17, wherein the control system is configured to ignore all joystick displacements other than on the joystick movement axis associated with the unlocked axis.

19. The system of claim 12, wherein the lock control instruction is based on a user input selecting one of the surge axis, the sway axis, and the yaw axis as the unlocked axis.

20. The system of claim 12, wherein the lock control instruction is generated by an autonomous propulsion controller.

21. The system of claim 20, wherein the control system is further configured to:

determine that a threshold uncommanded vessel movement is occurring on at least one of the surge axis, the sway axis, and the yaw axis; and automatically identify the lock control instruction and designate the at least one axis where the uncommanded vessel movement is occurring as at least one of the two locked axes.

* * * * *